(12) United States Patent
Sugahara et al.

(10) Patent No.: US 8,237,944 B2
(45) Date of Patent: Aug. 7, 2012

(54) DATA INPUT/OUTPUT SYSTEM, CONTROL METHOD AND CONTROL APPARATUS BASED ON COORDINATING THE INPUT AND OUTPUT PARAMETER LISTS

(75) Inventors: Yoshinori Sugahara, Kyoto (JP);
Satoshi Deishi, Ibaraki (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 593 days.

(21) Appl. No.: 12/513,561

(22) PCT Filed: Oct. 5, 2007

(86) PCT No.: PCT/JP2007/069574
§ 371 (c)(1),
(2), (4) Date: May 5, 2009

(87) PCT Pub. No.: WO2008/056495
PCT Pub. Date: May 15, 2008

(65) Prior Publication Data
US 2010/0067032 A1    Mar. 18, 2010

(30) Foreign Application Priority Data
Nov. 10, 2006    (JP) .................................. 2006-304968

(51) Int. Cl.
*G06F 3/12* (2006.01)
(52) U.S. Cl. ...................................... 358/1.13; 358/1.15
(58) Field of Classification Search .......................... None
See application file for complete search history.

(56) References Cited

U.S. PATENT DOCUMENTS

| | | | |
|---|---|---|---|
| 2002/0097452 A1* | 7/2002 | Nagarajan | 358/505 |
| 2004/0156069 A1* | 8/2004 | Kurotsu et al. | 358/1.13 |
| 2005/0146755 A1* | 7/2005 | Shimokawa et al. | 358/453 |
| 2007/0076237 A1* | 4/2007 | Kudo | 358/1.13 |

FOREIGN PATENT DOCUMENTS

| | | |
|---|---|---|
| JP | 4-168551 A | 6/1992 |
| JP | 7-104903 A | 4/1995 |
| JP | 2000-29592 A | 1/2000 |
| JP | 2000-172498 A | 6/2000 |
| JP | 2003-69780 A | 3/2003 |
| JP | 2005-122649 A | 5/2005 |
| JP | 2005-316653 A | 11/2005 |
| WO | WO 2008/056495 A1 | 5/2008 |

* cited by examiner

*Primary Examiner* — King Poon
*Assistant Examiner* — Ming Hon
(74) *Attorney, Agent, or Firm* — Buchanan Ingersoll & Rooney PC

(57) ABSTRACT

In a data input/output system having a plurality of input devices and a plurality of output devices, a display can be performed with a consistency maintained between an input parameter used to establish the operational condition of an input device to be used for data input and an output parameter used to establish the operational condition of an output device to be used for data output, and thereby the data input/output system, a data input/output method and a data input/output system control apparatus can be provided, wherein an optimum establishment of setting items which are related to a combination between input and output devices required in a case where a multiple of input and output devices are connected to one another can be easily done with reliability by use of a minimum number of operations and thereby eliminating erroneous operations.

15 Claims, 16 Drawing Sheets

FIG. 9a

```
[SCANNER INPUT PARAMETER LIST]

<SCANNER>
  <RESOLUTION>
     <ITEM> 300dpi </ITEM>
     <ITEM> 600dpi </ITEM>
     <ITEM> 1200dpi </ITEM>
  </RESOLUTION>
  <COLOR SELECTION>
     <ITEM> COLOR </ITEM>
     <ITEM> MONOCHROME </ITEM>
  </COLLAR SELECTION>
</SCANNER>
```
— IPL

FIG. 9b

```
[PRINTER OUTPUT PARAMETER LIST]

<PRINTER>
  <RESOLUTION>
     <ITEM> 600dpi </ITEM>
     <ITEM> 1200dpi </ITEM>
  </RESOLUTION>
  <COLOR SELECTION>
     <ITEM> COLOR </ITEM>
     <ITEM> MONOCHROME </ITEM>
  </COLLAR SELECTION>
  <STAPLE BINDING>
     <ITEM> PERFORMING </ITEM>
     <ITEM> NOT PERFORMING </ITEM>
  <STAPLE BINDING>
</PRINTER>
```
— OPL

```
[COORDINATION PARAMETER LIST]

<COMBINATION>
  <RESOLUTION>
     <ITEM> 600dpi </ITEM>
     <ITEM> 1200dpi </ITEM>
  </RESOLUTION>
  <COLOR SELECTION>
     <ITEM> COLOR </ITEM>
     <ITEM> MONOCHROME </ITEM>
  </COLLAR SELECTION>
  <STAPLE BINDING>
     <ITEM> PERFORMING </ITEM>
     <ITEM> NOT PERFORMING </ITEM>
  </STAPLE BINDING>
</COMBINATION>
```
— CPL

```
        [FIXED INPUT PARAMETER LIST]

<PRINTER>
      <RESOLUTION>
         <ITEM> 600dpi </ITEM>
      </RESOLUTION>
      <COLOR SELECTION>
         <ITEM> COLOR </ITEM>
      </COLLAR SELECTION>
    </PRINTER>
```
— FIPL

FIG. 12b

```
       [FIXED OUTPUT PARAMETER LIST]

<SCANNER>
      <RESOLUTION>
         <ITEM> 600dpi </ITEM>
      </RESOLUTION>
      <COLOR SELECTION>
         <ITEM> COLOR </ITEM>
      </COLLAR SELECTION>
      <STAPLE BINDING>
         <ITEM> PERFORMING </ITEM>
      </STAPLE BINDING>
    </SCANNER>
```
— FOPL

FIG. 13a

```
        [SCANNER INPUT PARAMETER LIST]

<SCANNER>
     <RESOLUTION>
        <ITEM> 300dpi </ITEM>
        <ITEM> 600dpi </ITEM>
        <ITEM> 1200dpi </ITEM>
     </RESOLUTION>
     <COLOR SELECTION>
        <ITEM> COLOR </ITEM>
        <ITEM> MONOCHROME </ITEM>
     </COLLAR SELECTION>
   </SCANNER>
```
— IPL

FIG. 13b

```
        [PRINTER OUTPUT PARAMETER LIST]

<PRINTER>
     <RESOLUTION RECOMMEND=1200dpi>
        <ITEM> 600dpi </ITEM>
        <ITEM> 1200dpi </ITEM>
     </RESOLUTION>
     <COLOR SELECTION>
        <ITEM> COLOR </ITEM>
     </COLLAR SELECTION>
     <STAPLE BINDING>
        <ITEM> PERFORMING </ITEM>
        <ITEM> NOT PERFORMING </ITEM>
     </STAPLE BINDING>
   </PRINTER>
```
— OPL

FIG. 14a

```
[COORDINATION PARAMETER LIST]

<COMBINATION>
  <RESOLUTION RECOMMEND=1200dpi>
      <ITEM> 600dpi </ITEM>
      <ITEM> 1200dpi </ITEM>
  </RESOLUTION>
  <COLOR SELECTION>
      <ITEM> COLOR </ITEM>
  </COLLAR SELECTION>
  <STAPLE BINDING>
      <ITEM> PERFORMING </ITEM>
      <ITEM> NOT PERFORMING </ITEM>
  </STAPLE BINDING>
</COMBINATION>
```
— CPL

FIG. 14b

PARAMETER SETUP SCREEN

RESOLUTION

● 1200dpi  ○ 600dpi

OK

CANCEL

STAPLE BINDING

○ PERFORMING  ○ NOT PERFORMING

[SCANNER INPUT PARAMETER LIST]

```
<SCANNER>
  <RESOLUTION>
     <ITEM> 300dpi </ITEM>
     <ITEM> 600dpi </ITEM>
  </RESOLUTION>
  <COLOR SELECTION>
     <ITEM> COLOR </ITEM>
     <ITEM> MONOCHROME </ITEM>
  </COLLAR SELECTION>
</SCANNER>
```
— IPL

FIG. 15b

[PRINTER OUTPUT PARAMETER LIST]

```
<PRINTER>
  <RESOLUTION>
     <ITEM> 600dpi </ITEM>
     <ITEM> 1200dpi </ITEM>
  </RESOLUTION>
  <COLOR SELECTION>
     <ITEM> COLOR </ITEM>
  </COLLAR SELECTION>
</PRINTER>
```
— OPL

FIG. 16

[COORDINATION PARAMETER LIST]

```
<COMBINATION>
  <RESOLUTION>
     <ITEM> 600dpi </ITEM>
  </RESOLUTION>
  <COLOR SELECTION>
     <ITEM> COLOR </ITEM>
  </COLLAR SELECTION>
</COMBINATION>
```
— CPL

FIG. 17a

```
[SCANNER INPUT PARAMETER LIST]

<SCANNER>
  <RESOLUTION>
     <ITEM> 1200dpi </ITEM>
     <ITEM> 2400dpi </ITEM>
  </RESOLUTION>
  <COLOR SELECTION>
     <ITEM> COLOR </ITEM>
     <ITEM> MONOCHROME </ITEM>
  </COLLAR SELECTION>
</SCANNER>
```
— IPL

FIG. 17b

```
[PRINTER OUTPUT PARAMETER LIST]

<PRINTER>
  <RESOLUTION>
     <ITEM> 300dpi </ITEM>
     <ITEM> 600dpi </ITEM>
  </RESOLUTION>
  <COLOR SELECTION>
     <ITEM> COLOR </ITEM>
  </COLLAR SELECTION>
  <STAPLE BINDING>
     <ITEM> PERFORMING </ITEM>
     <ITEM> NOT PERFORMING </ITEM>
  </STAPLE BINDING>
</PRINTER>
```
— OPL

FIG. 18a

```
[COORDINATION PARAMETER LIST]

<COMBINATION>
  <RESOLUTION>
     <ITEM URL=CONVERT.ORG/SERVICE/1200 TO 600>
     600dpi
     </ITEM>
     <ITEM URL=CONVERT.ORG/SERVICE/1200 TO 300>
     300dpi
     </ITEM>
  </RESOLUTION>
  <COLOR SELECTION>
     <ITEM> COLOR </ITEM>
  </COLLAR SELECTION>
  <STAPLE BINDING>
     <ITEM> PERFORMING </ITEM>
     <ITEM> NOT PERFORMING </ITEM>
  </STAPLE BINDING>
</COMBINATION>
```
— CPL

FIG. 18b

```
[FIXED INPUT PARAMETER LIST]

<SCANNER>
  <RESOLUTION>
     <ITEM URL=CONVERT.ORG/SERVICE/1200 TO 600>
     600dpi
     </ITEM>
  </RESOLUTION>
  <COLOR SELECTION>
     <ITEM> COLOR </ITEM>
  </COLLAR SELECTION>
</SCANNER>
```
— FIPL

FIG. 19

```
[SCANNER INPUT PARAMETER LIST]

<SCANNER>
  <RESOLUTION>
     <ITEM> 300dpi </ITEM>
     <ITEM> 600dpi </ITEM>
     <ITEM> 1200dpi </ITEM>
  </RESOLUTION>
  <COLOR SELECTION>
     <ITEM> COLOR </ITEM>
     <ITEM> MONOCHROME </ITEM>
  </COLLAR SELECTION>
</SCANNER>
```
— IPL

DATA INPUT/OUTPUT SYSTEM, CONTROL METHOD AND CONTROL APPARATUS BASED ON COORDINATING THE INPUT AND OUTPUT PARAMETER LISTS

RELATED APPLICATIONS

This application is a National Stage of International Application No. PCT/JP2007/069574, filed with the Japanese Patent Office on Oct. 5, 2007, which is based on Japanese Patent Application No. 2006-304968.

TECHNICAL FIELD

The present invention relates to a data input/output system, a data input/output system control method and a data input/output system control apparatus, particularly relates to a data input/output system, a data input/output system control method and a data input/output system control apparatus, which determine whether an output apparatus is able to output the input data inputted by the input apparatus and display it.

BACKGROUND OF THE INVENTION

In recent years, a data input/output apparatus having various functions called MFP (Multi Functional Peripheral) is becoming popular instead of a copy machine, a printer and a FAX machine, which have a single function. Further, a trend of a higher functionality and a tread of multi-functionality, such as connection with a network from a MFP are being enhanced. It is difficult for a user to master various functions which MFP has from the following reasons in connection with it. 1. There is no indicated information what kind of function the MFP itself has. 2. There is no indicated information how a function to use should be read-out. 3. There is no indicated information how a function to use should be set up.

Then, in order to solve the problems described above in items 1, 2 and 3, a patent reference No. 1 discloses clearly displaying a key which can be inputted at a next time based on a selected mode state in an image forming apparatus as a method of improving the operability of an operator guidance section. Patent reference No 2 discloses a technology for preventing a user from performing an excessive input operation and an erroneous operation by indicating whether it is possible to change or execute a setup of a setting item by an operation key on a display device in an image forming apparatus.

Patent reference 3 discloses controlling lighting of a candidate key to be operated next corresponding to the key previously operated, putting operation ranking on the keys, in cases where there are two or more candidate keys and performing lighting which has a difference in each key in the image forming apparatus.

However, each of the methods described in patent references No. 1, No. 2 and No. 3 is intended to describe an operation display section in the image forming apparatus with which data input/output functions have been fixed, and is not intended to describe a system to which many input apparatuses and output apparatuses are connected. Therefore, taking the coordination of an input function and an output function is not taken into consideration at all.

On the other hand, in patent reference 4, in order to input or output data between an application program in a computer and a user, there has been proposed a data output apparatus having a means for allowing a user to input or output data by selecting an input/output column which is necessary to input or output data and displaying the input column or the output column based on an arrangement rule on a screen.

Patent reference No. 1: Unexamined Japanese Patent Application Publication No. H7-104903
Patent reference 2: Unexamined Japanese Patent Application Publication No. 2005-122649
Patent reference 3: Unexamined Japanese Patent Application Publication No. 2005-316653
Patent reference 4: Disclosure of Unexamined Japanese Patent Application Publication No. 2000-172498

DISCLOSURE OF THE INVENTION

Problem to be Solved by the Invention

However, since the method of patent reference 4 also configures a display screen corresponding to the data form definition, it is possible to abolish that an application program is dependent on the model of a terminal apparatus. However, since a correspondence relation between the configuration of the screen to be displayed and the data type has been determined in advance, it is also difficult to take coordination of various input functions and output functions.

An object of the present invention is to provide a data input/output system and a data input/output system control method and a data input/output system control apparatus which are capable of easily and securely conducting a setting of an optimum setting item in a combination between input/output apparatuses, which become necessary when connecting a plurality of input/output apparatuses is connected each other and for eliminating erroneous operation to solve the problems described above.

Means to Solve the Problem

The following structure can attain the object of the present invention.

1. A data input/output system comprising:
a plurality of input apparatuses for inputting data;
a plurality of output apparatuses for outputting data;
a data path formation section which connects with the plurality of input apparatuses and the plurality of output apparatuses and forms a data path for outputting inputting data inputted either of the plurality of input apparatuses to either of the plurality of output apparatuses;
a first transmission and reception section which receives an input parameter list for setting an operation condition of the plurality of the input apparatuses among the plurality of the input apparatuses and stores;
a second transmission and reception section which receives an output parameter list for setting an operation condition of the plurality of the output apparatuses among the plurality of the output apparatuses and stores;
an input apparatus selection section which selects an input apparatus used for data input among the plurality of input apparatuses;
an output apparatus selection section which selects an output apparatus used for data output among the plurality of output apparatuses;
a parameter coordination section which performs a coordinating processing for coordinating the input parameter list of the input apparatus selected by the input apparatus selection section and an output parameter list of the output apparatus selected by the output apparatus selection section, and generates a coordination parameter list;
a display apparatus; and a display control section which executes the display apparatus to display an parameter setup screen based on the coordination parameter list.

2. A data input/output system disclosed in claim 1, wherein the coordinating processing is a processing for consolidating an item overlapping between the input parameter list of the input apparatus selected and the output parameter list of the output apparatus selected.

3. A data input/output system disclosed in claim 1, wherein the coordinating processing is a processing for consolidating a choice of items overlapping between the input parameter list of the input apparatus selected and the output parameter list of the output apparatus selected into a common choice between the input parameter list of the input apparatus selected and the output parameter list of the output apparatus selected.

4. A data input/output system disclosed in claim 1, wherein, when at lease one of the input parameter list of the input apparatus selected and the output parameter list of the output apparatus selected has a recommendation choice, the coordinating processing is a processing for reflecting the recommendation choice on a priority of a choice of the coordination parameter list.

5. A data input/output system disclosed in claim 1, wherein, when a choice of every item of the coordination parameter list is uniquely determined, the coordinating processing is a processing for outputting a display prohibiting signal which prohibit the display control section from executing the display to display a parameter setting screen based on the coordination parameter list.

6. A data input/output system disclosed in claim 1, wherein, when there are no overlapping item choice between the selected input apparatus and the output parameter list of the selected output apparatus, the coordinating processing is a processing for outputting a combination prohibiting information which prohibits a combination of the selected input apparatus and the selected output apparatus.

7. A data input/output system disclosed in claim 1, wherein, when there are no choice in the choice item overlapping between the input parameter list of selected input apparatus and the output parameter list of the selected output apparatus, the coordinating processing is a processing for complementing the overlapping item choice by a function which the an input apparatus and an output apparatus which data input/output system comprises other than the selected input apparatus and the selected output, or by a function which exists outside of the data input/output system.

8. A data input/output system disclosed in claim 1, wherein, the coordinating processing comprises a processing for checking if there is a defective in the input parameter list of selected input apparatus or the output parameter list of the selected output apparatus.

9. A control method of a data input/output system, the control method comprising:
a first receiving step for receiving and storing an input parameter list for setting an operation condition of an input apparatuses from a plurality of input apparatuses;
a second receiving step for receiving and storing an output parameter list for setting an operation condition of an output apparatuses from a plurality of output apparatuses;
an input apparatus selecting step for selecting an input apparatus used for data input among the plurality of the input apparatus;
an output apparatus selecting step for selecting an output apparatus used for data output among the plurality of the output apparatus;
a parameter coordination step for coordinating the input parameter list of the input apparatus selected in the input apparatus selecting step and the output parameter list of the output apparatus selected in the output apparatus selection step, and generates a coordination parameter list;
a displaying step for displaying an parameter setup screen based on the coordination parameter list.

10. A control apparatus in a data input/output system which comprises:
a plurality of input apparatuses for inputting data; and
a plurality of output apparatuses for outputting data,
the control apparatus comprising:
a data path formation section which connects with the plurality of input apparatuses and the plurality of output apparatuses and forms a data path for outputting inputting data inputted by any one of the plurality of input apparatuses to any one of the plurality of output apparatuses;
a first transmission and reception section which receives an input parameter list for setting an operation condition of the input apparatus among the plurality of the input apparatuses and stores;
a second transmission and reception section which receives an output parameter list for setting an operation condition of the output apparatus among the plurality of the output apparatuses and stores;
an input apparatus selection section which selects an input apparatus used for data input among the plurality of input apparatuses;
an output apparatus selection section which selects an output apparatus used for data output among the plurality of output apparatuses;
a parameter coordination section which performs a coordinating processing for coordinating the input parameter list of the input apparatus selected by the input apparatus selection section and an output parameter list of the output apparatus selected by the output apparatus selection section, and generates a coordination parameter list;
a display apparatus; and
a display control section which executes the display apparatus to display an parameter setup screen based on the coordination parameter list.

Effects of the Invention

According to the present invention, in a data input/output system having a plurality of input apparatuses and output apparatuses, by coordinating an input parameter which sets up the operation condition of the input apparatus used for data input and an output parameter which sets up the operation conditions of output apparatus used for data output, there can be provided a data input/output system, a data input/output system control method and a data input/output system control apparatus capable of easily and securely setting optimum setting items with a minimum operation in combination between input/output apparatuses, which are needed in case where many input/output apparatuses are connected, and eliminating operation mistakes.

BRIEF EXPLANATION OF THE DRAWINGS

FIGS. 9a and 9b respectively illustrate a schematic diagram showing an example of an input parameter list and an output parameter list.

FIGS. 12a and 12b respectively illustrate a schematic diagram showing an example of a fixed input parameter list and a fixed output parameter list.

FIGS. 13a and 13b respectively illustrate a schematic diagram showing an example of an input parameter list and an output parameter list for explaining a second example of a coordination process.

FIGS. 14a and 14b respectively illustrates a schematic diagram showing an example of a coordination parameter list and a parameter setup screen for explaining the second example of the coordination process.

FIGS. 15a and 15b and respectively illustrate a schematic diagram showing an example of an input parameter list and an output parameter list for explaining the third example of the coordination process.

FIG. 16 illustrates a schematic diagram showing an example of a coordination parameter list for explaining the third example of the coordination process.

FIGS. 17a and 17b respectively illustrates a schematic diagram showing an example of an input parameter list and an output parameter list for explaining the fifth example of the coordination process.

FIGS. 18a and 18b respectively illustrate a schematic diagram showing an example of a coordination parameter list and a fixed input parameter list for explaining the fifth example of the coordination process.

FIG. 19 illustrates a schematic diagram showing an example of an input parameter list for explaining the sixth example of the coordination process.

EXPLANATIONS OF SYMBOLS OR NUMERALS

Figure 1:
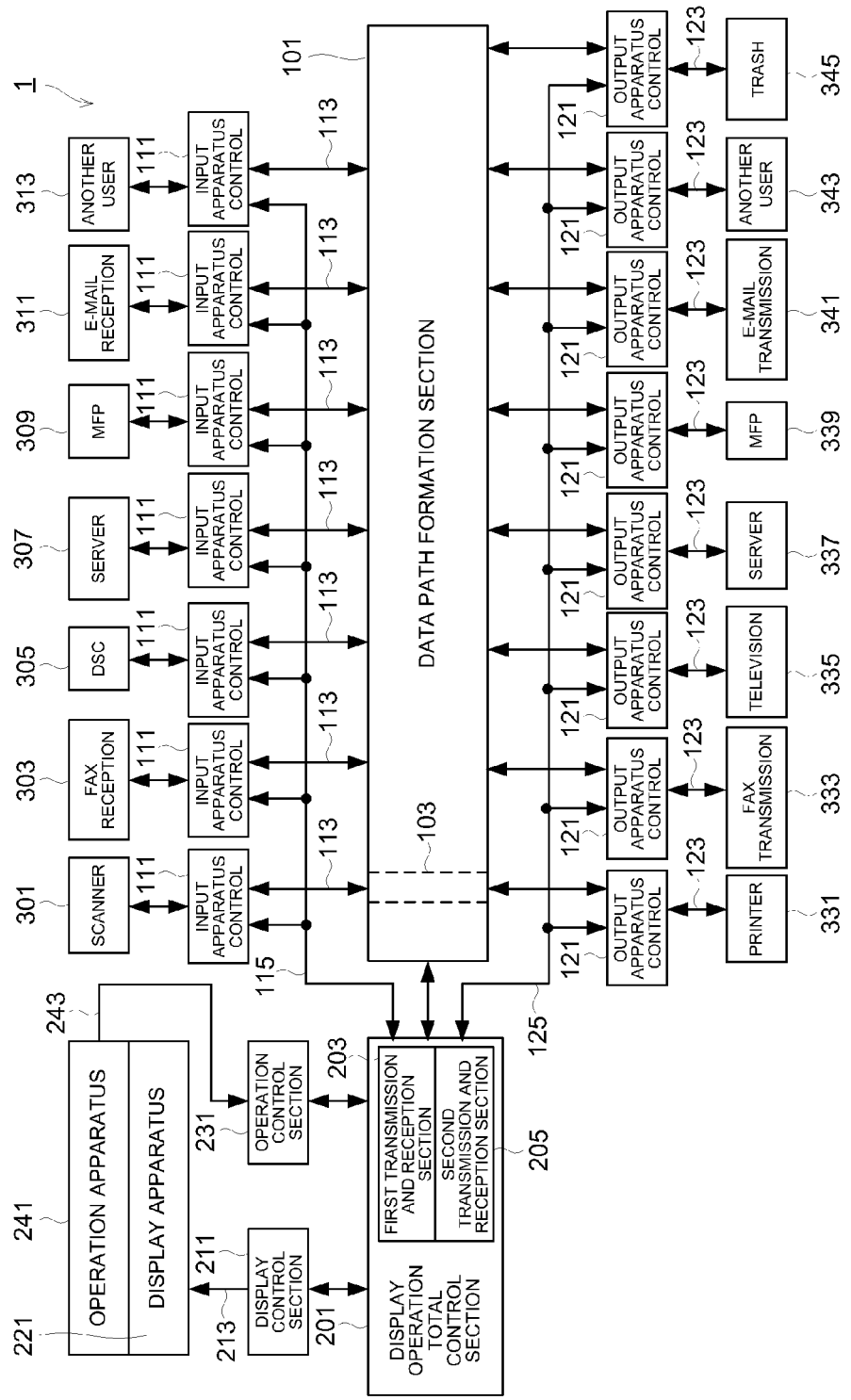
FIG. 1 illustrates a functional block diagram showing embodiment of a data input/output system.

1 DATA INPUT/OUTPUT SYSTEM
101 DATA PATH FORMATION SECTIONS
103 PIPE
111 INPUT APPARATUS CONTROL
113 INPUT DATA
121 OUTPUT APPARATUS CONTROL
123 OUTPUT DATA
201 DISPLAY OPERATION TOTAL CONTROL SECTION
203 FIRST TRANSMISSION RECEPTION SECTION
205 SECOND TRANSMISSION RECEPTION SECTION
211 DISPLAY CONTROL SECTION
213 DISPLAY CONTROL SIGNAL
221 DISPLAY APPARATUS
231 OPERATION CONTROL SECTION
241 OPERATION APPARATUS
243 OPERATION INFORMATION
301 INPUT FUNCTION FROM A SCANNER
303 FAX RECEPTION FUNCTION
305 DATA RECEPTION FUNCTION FROM DIGITAL CAMERA (DSC)
307 DATA RECEPTION FUNCTION FROM A SERVER, A PERSONAL COMPUTER (PC), OR A STORAGE
309 DATA RECEPTION FUNCTION FROM ANOTHER DATA INPUT/OUTPUT APPARATUS (MFP) OR ANOTHER DATA INPUT/OUTPUT SYSTEM
311 E-MAIL RECEPTION FUNCTION
313 DATA RECEPTION FUNCTION FROM OTHER USERS
331 PRINT FUNCTION TO PRINTERS
333 FAX TRANSMITTING FUNCTION
335 DISPLAY FUNCTION TO TELEVISION
337 DATA TRANSMISSION FUNCTION TO A SERVER, A PERSONAL COMPUTER (PC) OR A STORAGE
339 DATA TRANSMISSION FUNCTION TO ANOTHER DATA INPUT/OUTPUT APPARATUS (MFP) OR ANOTHER DATA INPUT/OUTPUT SYSTEM
341 E-MAIL TRANSMITTING FUNCTION
343 DATA TRANSMISSION FUNCTION TO OTHER USERS
345 ABANDONMENT FUNCTION TO TRASH
IPL INPUT PARAMETER LIST
OPL OUTPUT PARAMETER LIST
CPL COORDINATION PARAMETER LIST
FIPL FIXED INPUT PARAMETER LIST
FOPL FIXED OUTPUT PARAMETER LIST
IS INPUT APPARATUS SELECTION SCREEN
OS OUTPUT APPARATUS SELECTION SCREEN
PS PARAMETER SETUP SCREEN

PREFERRED EMBODIMENT OF THE INVENTION

Hereafter, although the present invention will be described based on an illustrated embodiment, the present invention is not limited to this embodiment. The same number is given to the same or equivalent portion in the drawings to omit overlapping explanation.

Firstly, a data input/output system in the present invention will be described using FIG. 1. FIG. 1 is a functional block diagram showing a structure of the data input/output system.

In FIG. 1, data input/output system 1 has various functions, such as an input function 301 from a scanner, a FAX reception function 303, a data reception function 305 from a digital camera (DSC), a data reception function 307 from a server, a personal computer (PC) or storage, a data reception function 309 from another data input/output apparatus (MFP), or another data input/output system, an e-mail reception function 311 and the various functions of data reception function 313 from another user.

With respect to an output function, there are provided a print function 331 to a printer, a FAX transmitting function 333, a display function 335 to a television, or a data transmission function 337 to a server, a personal computer (PC) or a storage, a data transmission function 339 to another data input/output apparatus (MFP), or another data input/output system, an e-mail transmitting function 341, a data transmission function 343 to another user and a delete function 345 to a trash. Data input/output system 1 executes combining of these input functions and output functions to provide service for a user. The combination of input/output functions has combinations of 1 to 1, 1 to many and many to many.

Described various input functions and a data path formation section 101 are connected by an input apparatus control 111.

The input apparatus control 111 is the input function described above or a control program created for the input apparatus for achieving each input function, and it controls each input function or the input apparatus to perform an input operation, and generates input data 113.

Similarly, various output functions and the data path formation section 101 are connected by an output apparatus control 121. The output apparatus control 121 is a control program created for the each output function described above or the output apparatus for achieving described each output function. The output apparatus control 121 controls each output function or the output apparatus to perform the output operation, receives the input data 113 generated by the input apparatus control 111 through the pipe 103 which is formed by the data path formation section 101, which will be described later, and generates the output data 123 by converting the input data 113.

Here, although each input/output have been defined by the function, there is no restriction in particular about the connection between the data input/output system 1 and each input/output apparatus. As long as a function is realizable, any kind of connection state will be acceptable. For example, as long as it can achieve the input function 301 from a scanner, the scanner itself may be directly connected with the data input/output system 1, or, it may be connected via a network. Furthermore, as long as a function is realizable, the apparatus for exclusive use for realizing the function does not need to exist. For example, as long as it can achieve a transceiver function in the FAX, it may not be necessary to be a FAX machine itself. For example, it may be substituted by a FAX transceiver function of a PC. Each input/output function may be alternatively added and deleted by data input/output system 1. Therefore, in the state where all the old output functions are separated from the data input/output system 1, the control apparatus of data input/output system 1 will be configured.

The input apparatus control 111 holds an input parameter list IPL for a setup of each input function or each input apparatus at the time of data input. The output apparatus control 121 holds an output parameter list OPL for a setup of each output function or each output apparatus at the time of data output. Input parameter list IPL and output parameter list OPL will be described in detail by in the explanation of FIGS. 9a and 9b.

Each input apparatus control 111 and a first transmission and reception section 203 built in a display operation total control section 201 are connected with an input parameter signal line 115. Each input apparatus control 111 transmits the input parameter list IPL of the input apparatus which is controlled by the input apparatus control 111 itself towards the first transmission and reception section 203 at the time of starting of input apparatus which is controlled by the input apparatus control 111 itself. This requires registration of the input parameter list IPL of the input apparatus which is controlled by the input apparatus control 111 itself. In case where it becomes impossible to use the input apparatus which is controlled by the input apparatus control 111 itself due to the power supply OFF etc, deletion of the input parameter list IPL of the input apparatus which is controlled by the input apparatus control 111 itself is required to the first transmission and reception section 203.

Similarly, each output apparatus control 121 and a second transmission and reception section 205 built in the display operation total control section 201 are connected via an output parameter signal line 125. Each output apparatus control 121 requires the registration of the output parameter list OPL of the output apparatus which is controlled by the output apparatus control 121 itself by transmitting the output parameter list OPL of the output apparatus which is controlled by the output apparatus control 121 itself towards the second transmission and reception section 205 at the time of starting of the output apparatus which is controlled by the output apparatus control 121 itself. In case where it becomes impossible to use the output apparatus which is controlled by the output apparatus control 121 itself due to the power supply OFF or out of toner, deletion of the output parameter list OPL of the output apparatus which is controlled by the output apparatus control 121 itself is required towards the second transmission and reception section 205.

Data path formation section 101 forms a data path (henceforth a pipe) 103 for virtually connecting between input functions and output functions which are selected by user, or for transmitting and receiving input data 113.

A display operation total control section 201 receives a deletion request of the input parameter list IPL of the input apparatus, or the input parameter list IPL from the input apparatus control 111 via the first transmission and reception section 203. The display operation total control section 201 receives a deletion request of the output parameter list OPL of the output apparatus, or the output parameter list OPL from the output apparatus control 121 via the second transmission and reception section 205. And the display operation total control section 201 updates the input parameter list IPL of each input function and the output parameter list OPL of each output function which are held each time when receiving the deletion request. The display operation total control section 201 transmits an input parameter determined by the operation, which will be described later in FIG. 2 onward, to the input apparatus control 111 via the first transmission and reception section 203. Similarly, the display operation total control section 201 transmits a fixed output parameter to the output apparatus control 121 via the second transmission and reception section 205 by the operation, which will be described later in FIG. 2 onward.

The display operation total control section 201 displays an input apparatus selection screen IS and an output apparatus selection screen OS on a display 221 via the display control section 211. The user can perform selection of an input function and an output function using an operation apparatus 241. Here, the display operation total control section 201, the display control section 211, the display 221, the operation apparatus 241 and the operation control section 231 function as an input apparatus selection section and an output apparatus selection section.

The display operation total control section 201 takes the coordination of the input parameter list IPL of the input function and the output parameter list OPL of the output function which have been selected by a user, and generates a coordination parameter list CPL. Based on the coordination parameter list CPL, a parameter setup screen PS is displayed on the display 221 via the display control section 211. The user can set a parameter of the input/output function using the operation apparatus 241. The display operation total control section 201 functions here as a parameter coordination section. The display operation total control section 201 sends back the parameter set by the user to the input apparatus control 111 which controls the selected input function and the output apparatus control 121 which controls the selected output function. Details will be described in the explanation of FIG. 2 onward.

The display 221 comprises a liquid crystal etc., for example, and a character and an image can be displayed according to the display control signal 213 from the display control section 211. The operation apparatus 241 is a touch panel arranged, for example, on the screen of the display 221. A user can perform various kinds of operations, such as, a selection operation, an input operation and a change operation on the screen by touching the operation apparatus 241 on a character and an image which were displayed on display 221. Various kinds of operation information 243 including a selection, an input, a change, etc., performed by the operation control section 241 is detected by the operation control section 231 and transmitted to the display operation total control section 201.

Figure 2:
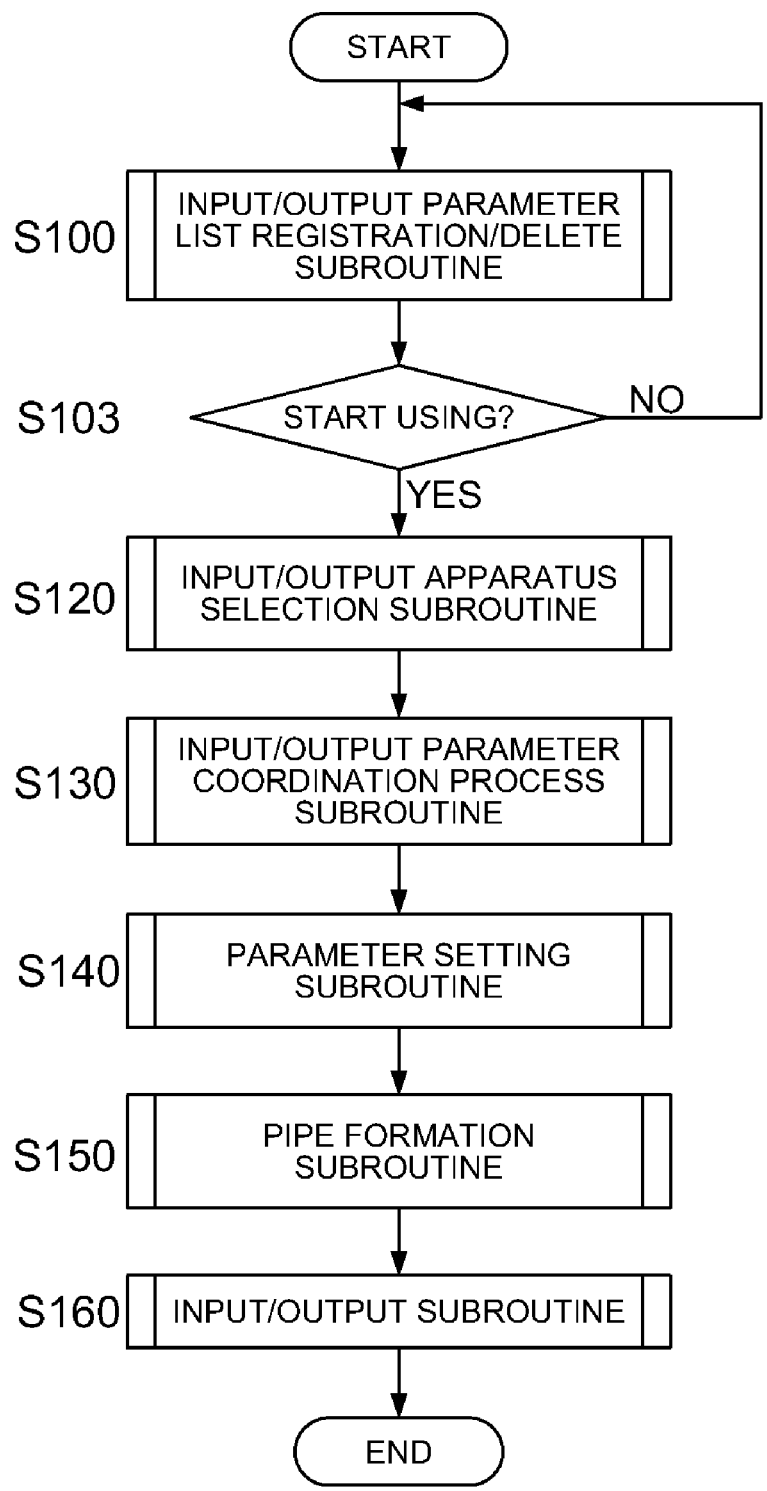
FIG. 2 illustrates a main routine of a flow chart which shows a flow of input/output operation of data in a data input/output system.

Next, an embodiment of data input/output operation in the data input/output system 1 will be described using FIGS. 2-11. FIGS. 2-8 illustrate flow charts which show a flow of the data input/output operation in the data input/output system 1. FIG. 2 illustrates a main routine and FIGS. 3-8 illustrate subroutines of FIG. 2. Here, what is called a copy operation for inputting a paper sheet document using a scanner and outputting it to a printer will be explained as an example of a data input/output operation. However, although it may be other input/output operations, a view of the operation will be the same.

Figure 3:
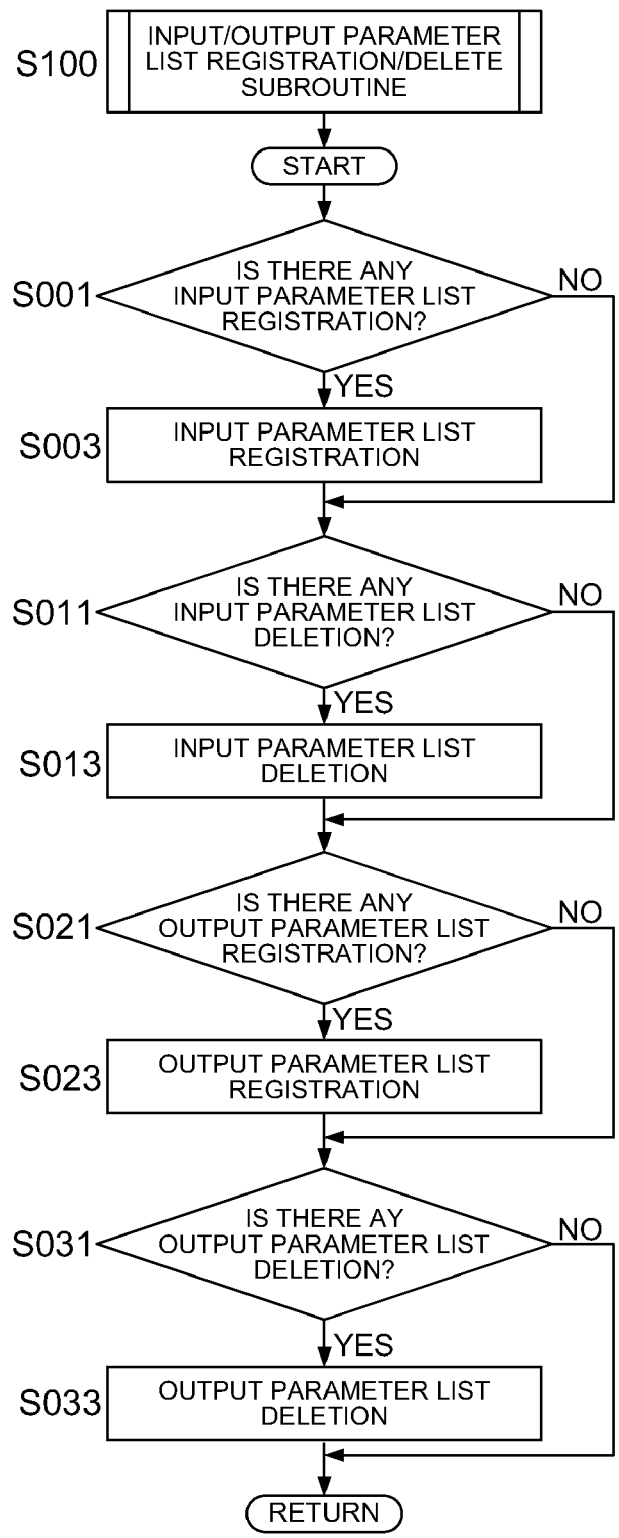
FIG. 3 illustrates a subroutine (1/6) of FIG. 2.

In FIG. 2, when the power supply of the data input/output system 1 is turned on or a starting command is inputted into the data input/output system 1, and the operation of the data input/output system 1 is started, STEP S100 "an input/output parameter list registration/delete subroutine" illustrated in FIG. 3 will be executed first. Next, in STEP S103, whether the start using operation, such as, pushing a start button of the data input/output system 1 has been performed, is checked. Operations from STEP S100 to STEP S103 will be repeated until the start using operation is performed.

When the start using operation is performed (STEP S103; Yes), STEP S120 "an input/output apparatus selection subroutine" shown in FIG. 4 will be executed, and an input function and an output function will be selected. Next, STEP S130 "an input/output parameter coordination process subroutine" shown in FIG. 5 is executed. A coordination process, which takes coordination of the input parameter list IPL of the selected input function and the output parameter list OPL of the selected output function, is performed according to the input/output parameter coordination process subroutine.

Figure 6:
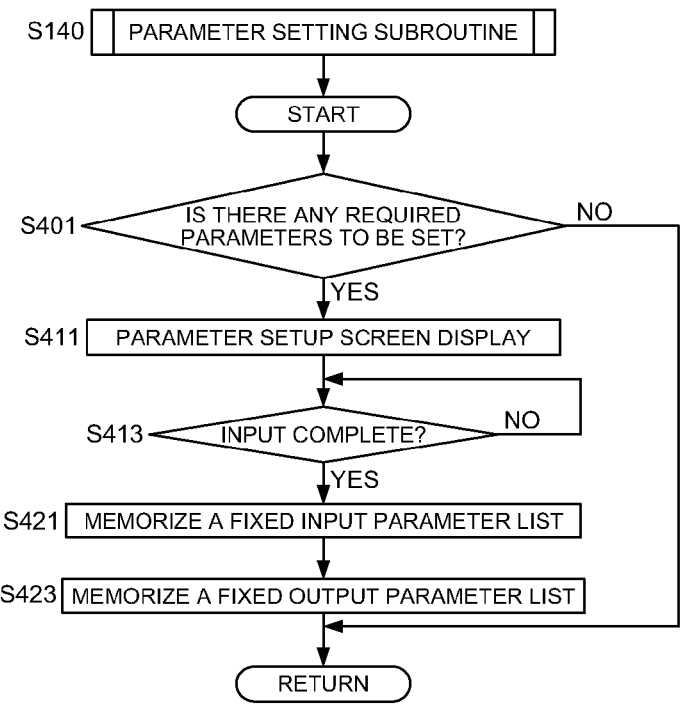
FIG. 6 illustrates a subroutine (4/6) of FIG. 2.
Figure 7:
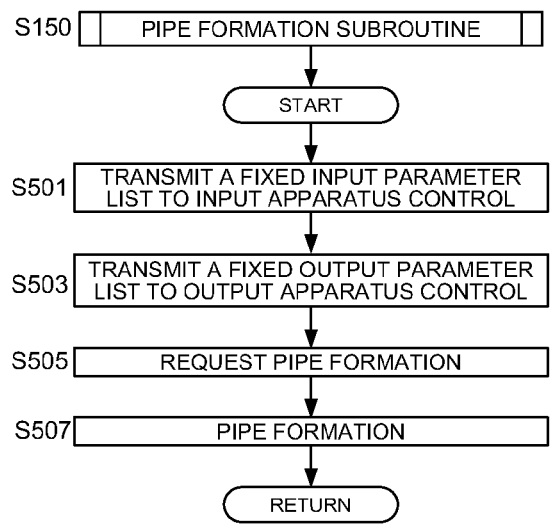
FIG. 7 illustrates a subroutine (5/6) of FIG. 2.
Figure 8:
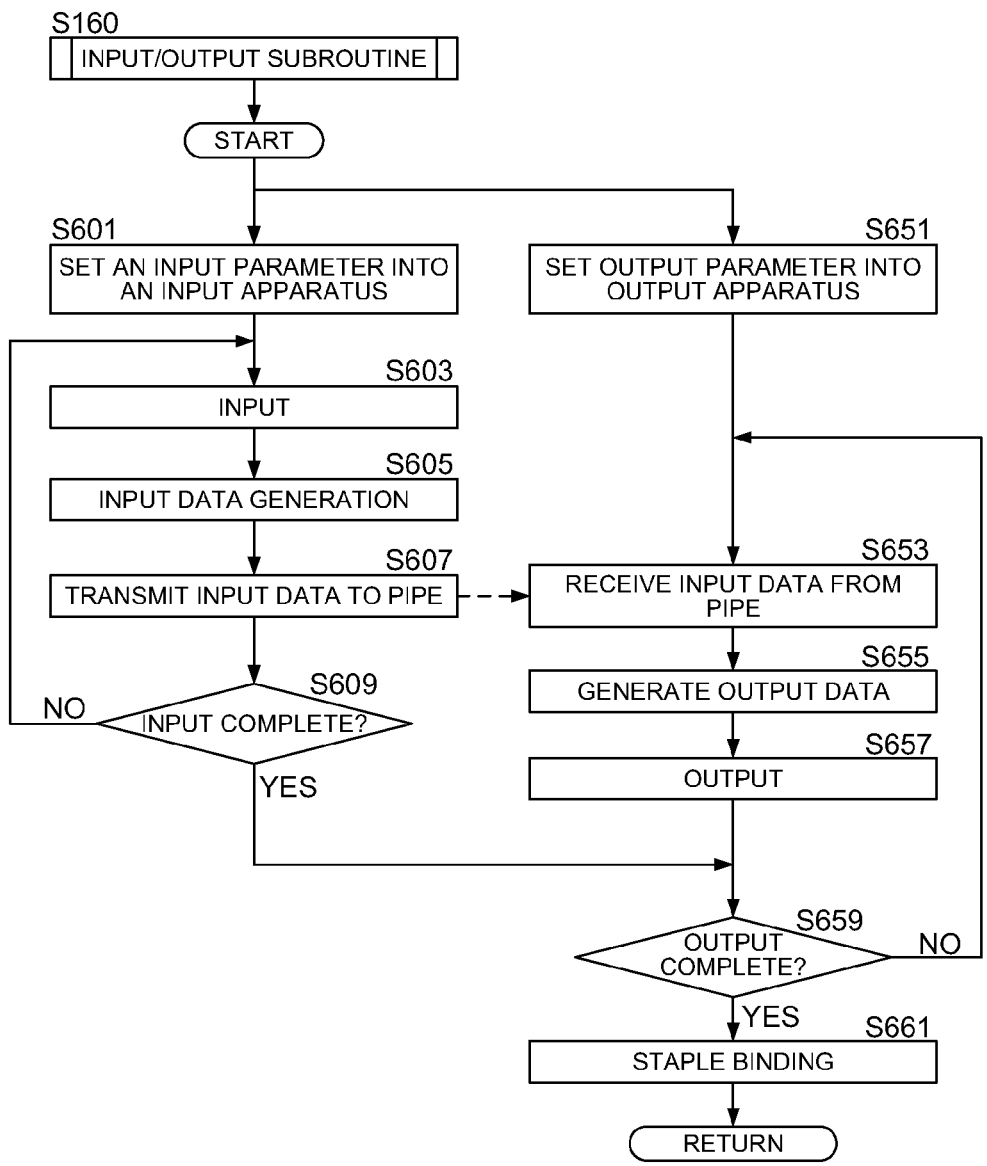
FIG. 8 illustrates a subroutine (6/6) of FIG. 2.

Next, STEP S140 "parameter setting subroutine" shown in FIG. 6 is executed, and parameter setting with respect to input/output is performed by a user. Then, STEP S150 "pipe formation subroutine" shown in FIG. 7 is executed, and a pipe 103 for transmitting and receiving input data 113 is formed between the selected input function and the output function. Finally, STEP S160 "input/output subroutine" shown in FIG. 8 is executed. An input is performed by the selected input function and inputted input data 113 is transmitted to the selected output function via the pipe 103. The Input data 113 is outputted by the selected output function, and a series of operations are ended.

FIG. 3 shows STEP S100 "input/output parameter list registration/delete subroutine" in the main routine shown in FIG. 2.

In FIG. 3, it is checked whether the registration requirement of the input parameter list IPL of the input apparatus which is controlled by each input apparatus control 111 has been performed from each input apparatus control 111 to the first transmission and reception section 203. In case where the registration requirement is performed (STEP S001; Yes), in STEP S003, the input parameter list IPL of the input function with which a registration requirement has been performed is registered into the display operation total control section 201, and the process proceeds to STEP S011. In case where the registration requirement is not performed (STEP S001; No), the process directly progresses to STEP S011.

Here, the input parameter list IPL of the input apparatus is a list as showed in FIG. 9a, which is an example of a scanner. Parameter items which are necessary to be set up and choices which the parameters can take in case where an input function is used are indicated in the input parameter list IPL of the input apparatus. In the example shown in FIG. 9a, there are "resolution" and "color selection" as parameters. "Resolution" has choices of "300 dpi", "600 dpi" and "1200 dpi". "Color selection" has choices of "color" and "monochrome".

In STEP S011, it is checked whether, the deletion request of the input parameter list IPL of the input apparatus which each input apparatus control 111 controls has been given from each input apparatus control 111 to the first transmission and reception section 203. In case where the deletion request is performed (STEP S011; Yes), in STEP S013, the input parameter list IPL of an input function to which the deletion request is performed is deleted from the display operation total control section 201, and the process advances to STEP S021. In case where the deletion request is not performed (STEP S011; No), the process directly advances to STEP S021. STEPs S001-S013 function as a first receiving process.

In STEP S021, it is checked whether the registration request of the output parameter list OPL of the output apparatus which each output apparatus control 121 controls has been given from each output apparatus control 121 to the second transmission and reception section 205. In case where the registration request is performed (STEP S021; Yes), in STEP S023, the output parameter list OPL of the output function to which the registration request is performed is registered into the display operation total control section 201, and the process advances to STEP S031. In case where the registration request has not been performed (STEP S021; No), the process directly advances to STEP S031.

Here, the output parameter list OPL of the output apparatus is a list, which looks like an example of a printer shown in FIG. 9b. In the output parameter list OPL, parameter items which is needed to be set up and the choices, which the parameters can take when an output function performed, are listed. In an example of FIG. 9b, there are "resolution", "color selection" and "staple binding" as parameters. "Resolution" has choices of "600 dpi" and "1200 dpi". "Color selection" has choices of a "color" and "monochrome". "Staple binding" has choices of "performing" and "not performing"

In STEP S031, it is checked whether the deletion request of the output parameter list OPL of the output apparatus, which each output apparatus control 121 controls, has been given from each output apparatus control 121 to the second transmission and reception section 205. In case where the deletion request is performed (STEP S031; Yes), in STEP S033, the output parameter list OPL of the output function to which the deletion request performed is deleted from the display operation total control section 201, and returns to STEP S100 of the main routine. In case where there is no deletion request (STEP S031; No), the process directly returns to STEP S100 of the main routine. STEPs S021-S033 function as the second receiving process.

Figure 4:
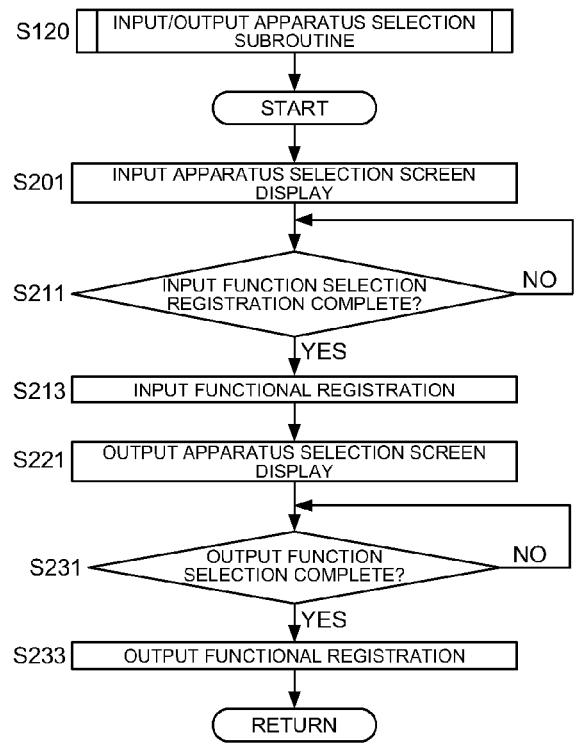
FIG. 4 illustrates a subroutine (2/6) of FIG. 2.
Figure 5:
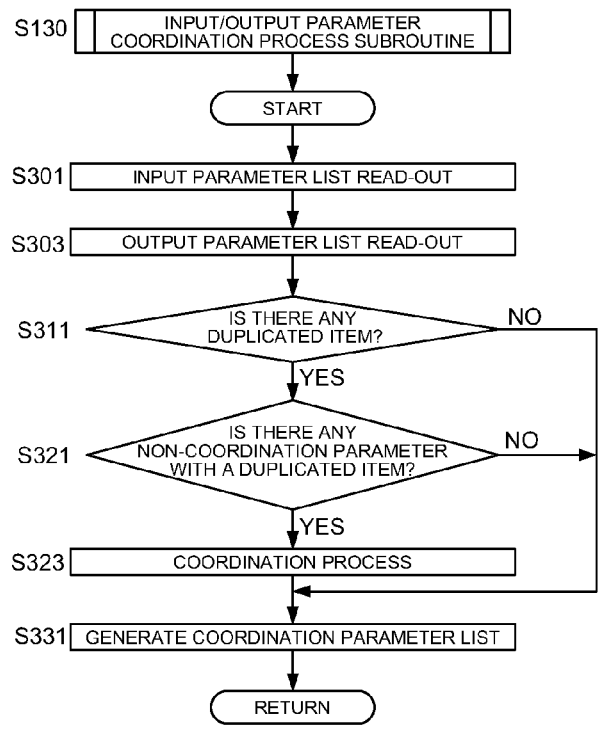
FIG. 5 illustrates a subroutine (3/6) of FIG. 2.

FIG. 4 shows STEP S120 "input/output apparatus selection subroutine" of the main routine shown in FIG. 2.

In FIG. 4, an input apparatus selection screen IS is displayed on the display 221 via the display control section 211 by the display operation total control section 201 in STEP S201.

Figure 10A:
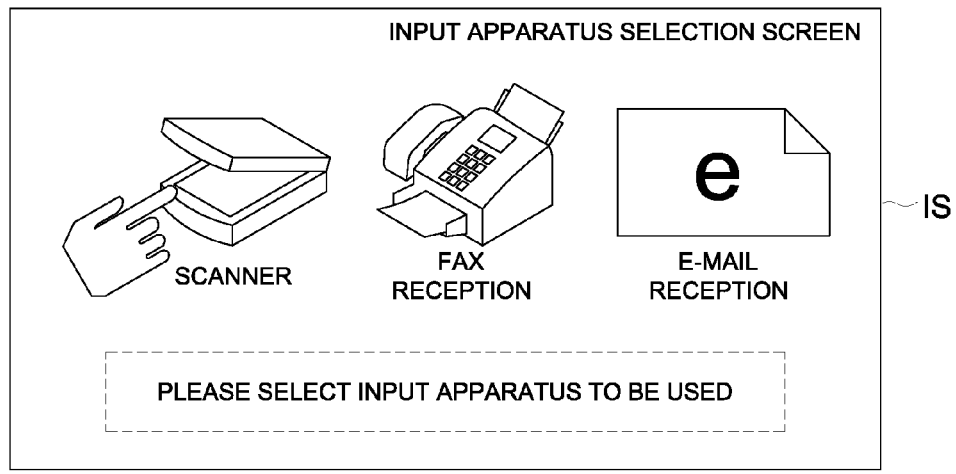
FIGS. 10a and 10b respectively illustrate a schematic diagram showing an example of an input apparatus selection screen and an output apparatus selection screen.

Here, the input apparatus selection screen IS is a screen which is illustrated in FIG. 10a. Figures (henceforth an icon) for expressing all the input functions (here as examples, an input function 301 from the scanner, a FAX reception function 303 and an e-mail reception function 311 are supposed to be usable among each input function shown in FIG. 1) usable in the input functions with which the data input/output system 1 equips will be displayed on the display 221. Simultaneously, a message urged to a user to select an input function is displayed. The user can select an input function which is used by touching an icon of the input apparatus displayed on the display 221 with a finger via a touch panel which is operation apparatus 241.

In STEP S211, it is checked whether the selection of the input function has been completed. The process is in a standby mode at STEP S211 until selection is completed. Here, input function 301 from a scanner is supposed to have been selected by a user as an input function. Completion of selection of the input function (STEP S211; Yes) will register the input function 301 from the scanner into the display operation total control section 201 as an input function used in STEP S213. STEPs S201-S213 function as an input apparatus selection process.

In STEP S221, an output apparatus selection screen OS is displayed on the display 221 via the display control section 211 by the display operation total control section 201.

Figure 10B:
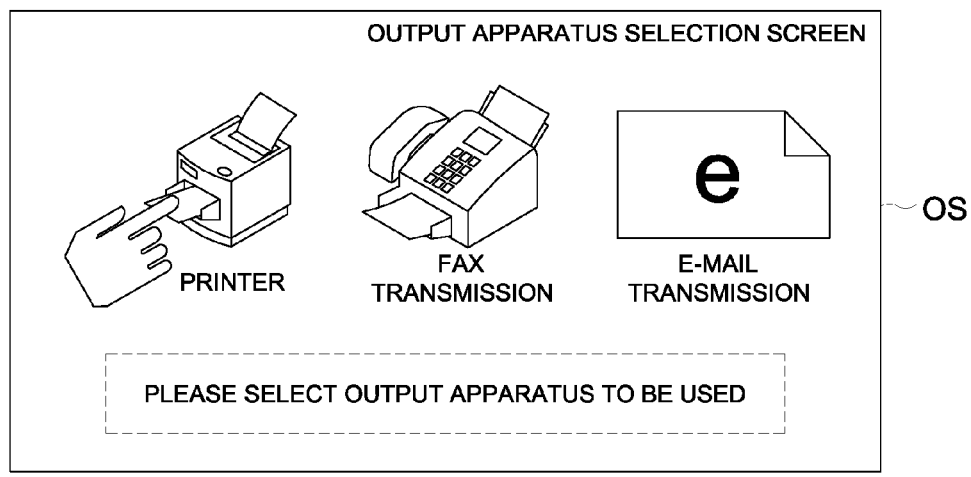

Here, the output apparatus selection screen OS is a screen which is illustrated in FIG. 10b, and icons which expresses all the usable output functions in the output functions with which the data input/output system 1 is provided are displayed on the display 221. (Here, a print function 331 to a printer, a FAX transmitting function 333 and an e-mail transmitting function 341 are supposed to be usable among the output functions illustrated in FIG. 1). Simultaneously, a message urged to a user to select an output function is displayed. The user can select an output function which is used by touching an icon of the output apparatus displayed on the display 221 with a finger via a touch panel which is operation apparatus 241.

It is checked at STEP S231 whether selection of an output function has been completed. The process is in a standby mode at STEP S231 until the selection is completed. Here, a print function 331 to a printer is supposed to have been selected by a user as an output function. When selection of an output function is completed (STEP S231; Yes), in STEP S233, the print function 331 to a printer will be registered into display operation total control section 201 as an output function to be used, and the process will return to STEP S120 of the main routine. STEPs S221-S233 function as an output apparatus selection process.

Here, it has been described that the input apparatus selection screen IS and the output apparatus selection screen OS are displayed in order, so that a user can separately select the input function and the output function. An icon of the input apparatus may be displayed on the left-hand side of the display 221 and an icon of the output apparatus may be simultaneously displayed on the right-hand side of the display 221 so that the user can select both of the input function and the output function on the same screen.

FIG. 5 shows STEP S130 "input/output parameter coordination process subroutine" of the main routine of FIG. 2. STEP S130 functions as a parameter coordination process.

In FIG. 5, the input parameter list IPL registered into the display operation total control section 201 of an input function (here input function 301 from a scanner) selected at STEP S120 is read in STEP S301. In STEP 303, the output parameter list OPL registered into the display operation total control section 201 of the output function selected in STEP S120 is read in STEP S303. (Here print function 331 to a printer)

It is verified by the display operation total control section 201 whether an overlapping parameter item exists between the input parameter list IPL read in STEP S301 and the output parameter list OPL read in STEP S303 in STEP S311. In cases where an overlapping parameter item does not exist (STEP S311; No), the process advances to STEP S331. In case where an overlapping parameter item exists (STEP S311; Yes), it is verified whether there is a non-coordination choice in the choices which a parameter in the overlapping parameter items can take in STEP S321. In case where there is no non-coordination choice (STEP S321; No), the process advances to STEP S331.

In case where there is a non-coordination choice (STEP S321; Yes), in STEP S323, a coordination process, which selects only a choice common to both the input function and the output function in the choices, which a parameter in the overlapped parameter can take, is performed, and the process advances to STEP S331.

In the input parameter list IPL and the output parameter list OPL which are illustrated to FIG. 9, "resolution" and "color selection" are the parameter items which overlap with both lists, and the "staple binding" is a parameter item which exists only in output parameter list OPL.

The input parameter list IPL has three choices of "resolution" which are "300 dpi", "600 dpi" and "1200 dpi", and the output parameter list OPL has two choices of "resolution", which are "600 dpi" and "1200 dpi". In this case, in the coordination process of STEP S323, two of "600 dpi" and "1200 dpi", which are common to both lists, are chosen. Since both lists have choices of "color" and "monochrome" about "color selection", "color" and "monochrome" are chosen as choice as it is.

At STEP S331, a coordination parameter list CPL into which parameters have been coordinated and summarized in STEPs S311-S323 is generated, and the process returns to STEP S130 of the main routine.

Figures 11A, 11B:
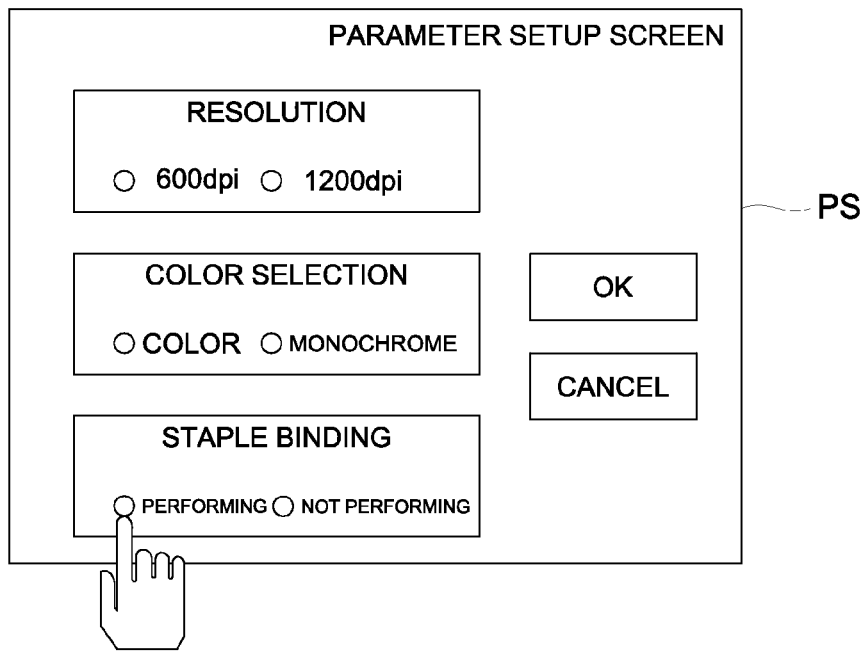
FIGS. 11a and 11b respectively illustrates a schematic diagram showing an example of a coordination parameter list and a parameter setup screen.

Here, the coordination parameter list CPL is the list which is illustrated in FIG. 11(a). "Resolution", "color selection" and "staple binding" are described as parameter items in this example. There are "600 dpi" and "1200 dpi" as choices of "resolution". There are "color" and "monochrome" as choices of "color selection", and "performing" "not perforating" is indicated as choices of the "staple binding".

FIG. 6 illustrates STEP S140 "parameter setting subroutine." of a main routine shown in FIG. 2.

In FIG. 6, it is verified whether a parameter which has a choice in the coordination parameter list CPL generated in STEP S331 of FIG. 5 is memorized in STEP S401. In case when the choice is not memorized (STEP S401; No), it is determined that a setup of a parameter is unnecessary and the process returns to STEP S140 of the main routine as it is. In case when the choice is memorized (STEP S401; Yes), the parameter setup screen PS will be displayed on the display 221 in STEP S411 by the display operation total control section 201 via the display control section 211. STEPs S401 and S411 function as a display process.

Here, the parameter setup screen PS is a screen as illustrated in FIG. 11b. The parameter setup screen PS is a screen, which requests a user to input the parameter in the coordination parameter list CPL. Here, "600 dpi" and "1200 dpi" are displayed as choices of "resolution". "Color" and "monochrome" are displayed as choices of "color selection". "Performing" and "not performing" are displayed on the display 221 as choices of the "staple binding". The user can select a parameter by touching a choice displayed on the display 221 with a finger via a touch panel which is an operation apparatus 241.

It is checked in STEP S413 whether an input of a parameter has been completed. Completion of the input is verified by, for example, that an "O.K." button on the parameter setup screen PS has been pushed by user is detected by the operation control section 231. The process is in a standby mode in STEP S413 until the input is completed. Here, suppose that "resolution=600 dpi", "color selection=color" and "staple binding=Performing" have been setup by a user.

When the input is completed (STEP S413; Yes), the fixed input parameter list FIPL which contains a parameter which the user has fixed in STEP S413 will be memorized by the display operation total control section 201 in STEP S421. The fixed output parameter list FOPL which contains a parameter which a user has fixed at STEP S413 is memorized by the display operation total control section 201 at STEP S423. The process returns to STEP S140 of the main routine.

Here, the fixed input parameter list FIPL is look like a screen illustrated in FIG. 12 a, and the written contents are "resolution=600 dpi" and "color selection=color" in the example described above. The fixed output parameter list FOPL is look like a screen which is illustrated in FIG. 12b, and the written contents are "resolution=600 dpi", "color selection=color" and "staple binding=performing" in the example as described above.

FIG. 7 shows STEP S150 "pipe formation subroutine" of the main routine of FIG. 2.

In FIG. 7, in STEP S501, the fixed input parameter list FIPL registered in STEP S421 is transmitted into the input apparatus control 111 which controls a scanner via the first transmission and reception section 203 by the display operation total control section 201. Here, the written contents of the fixed input parameter list FIPL are "resolution=600 dpi" and "color selection=color."

In STEP S503, the fixed output parameter list FOPL registered in STEP S423 is transmitted to the output apparatus control 121 which controls the printer via the second transmission and reception section 205 by the display operation total control section 201. Here, the written contents of the fixed output parameter list FOPL are "resolution=600 dpi", "color selection=color" and "staple binding=Performing".

In STEP S505, the formation of the pipe 103 for transmission and reception of the input data 113 between both of the input apparatus control 111 and the output apparatus control 121 is requested to the data path formation section 101 from the input apparatus control 111 which controls a scanner and the output apparatus control 121 which controls a printer. In STEP 507, the pipe 103 is formed between the input apparatus control 111 which controls the scanner and the output apparatus control 121 which controls the printer by the data path formation section 101 in response to the pipe formation request in STEP S505. Then, the process returns to STEP S150 of the main routine.

FIG. 8 shows STEP S160 "input/output subroutine" of a main routine of FIG. 2.

In FIG. 8, in STEP S601, the scanner parameter is set to the written contents of the fixed input parameter list FIPL received from the display operation total control section 201 via the first transmission and reception section 203 by the input apparatus control 111 which controls the scanner. A document placed on a document holder of the scanner is scanned in STEP S603, and input data 113 is generated by the input apparatus control 111 which controls the scanner in STEP S605. In STEP S607, input data 113 generated in STEP S605 is transmitted to the pipe 103 formed in STEP S507.

In STEP S609, it is checked whether all document inputs placed on the document holder of the scanner have been completed. STEPs S603-609 are repeated until it is completed. When all document inputs are completed (STEP S609; Yes), process will wait until the output is completed in STEP S659.

On the other hand, in STEP S651, the parameter of the printer is set in the written contents of the fixed output parameter list FOPL received from the display operation total control section 201 via the second transmission and reception section 205 by the output apparatus control 121 which controls the printer. In STEP S653, the input data 113 transmitted from the input apparatus control 111 which controls the scanner in STEP S607 is received by the output apparatus control 121 which controls the printer via the pipe 103. In STEP S655, the output data 123 to be outputted from the printer is generated from the input data 113, and the output data 123 is printed with the printer in STEP S657.

STEPs S653-S659 are repeated until it is confirmed whether all outputs have been finished and all outputs are completed in STEP S659. When all outputs are completed (STEP S659; Yes), the staple binding will be performed in STEP S661, the process will return to STEP S160 of the main routine and the series of operations will be ended.

According to an embodiment of the input/output operation of data in the data input/output system 1 described above, a coordination process which takes an coordination of an input parameter which sets up operation conditions of the input function used for input/output of data, and an output parameter which sets up operation conditions of an output function is performed. According to this, it is not necessary to define a setting item for every combination of the input apparatus and the output apparatus in advance even though an increase and decrease of the input/output functions connected to data input/output system 1 occurs. And, a user can be provided with operability which is equal to or more than the operability of the case where a definition is given in advance.

Next, the second example of the coordination process described above will be explained using FIGS. 13a, 13b 14a, and 14b. FIGS. 13a and 13b illustrate respectively a schematic diagram showing an example of the input parameter list IPL and the output parameter list OPL for explaining the second example the coordination process. FIGS. 14a and 14b respectively illustrate a schematic diagram showing an example of the coordination parameter list CPL1 for explaining the second example of the coordination process, and a parameter setup screen PS.

In FIGS. 13a and 13b, the input parameter list IPL of the scanner is the same list as the example illustrated in FIG. 9(a), as shown in FIG. 13a. There are "resolution" and "color selection" as parameter items, and "resolution" has choices of "300 dpi", "600 dpi" and "1200 dpi". "Color selection" has choices of a "color" and "monochrome". On the other hand, as shown in FIG. 13b, the output parameter list OPL of the printer is different from the list illustrated in FIG. 9b in the following two points that "color selection" has only a choice of color and does not have a choice of monochrome, and "1200 dpi" is defined as "resolution" as a recommendation choice.

When the coordination of the input parameter list IPL of an example described above and the output parameter list OPL are taken, as shown in the coordination parameter list CPL of FIG. 14a, "resolution" has choices of "600 dpi" and "1200 dpi" and "1200 dpi" is a recommendation choice. "Color selection" has only "color" and does not have choices. "Staple binding" has "performing" and "not performing" as choices.

Then, in the parameter setup screen PS, as shown in FIG. 14b, "1200 dpi" which is a recommendation choice of "resolution" is arranged in the left-hand side and displayed in a state where it has been selected in advance. As a result of the coordination process, a choice is uniquely determined and the item is not displayed on the parameter setup screen PS with respect to "color selection" which does not have a choice of selection to the user.

According to the second example of the coordination process described above, a recommendation choice is arranged in the left-hand side and displayed in a state as it has been selected in advance so that a user can clearly understand that it is a recommendation choice. Further, as a result of the coordination process, the choice is uniquely determined and incorrect selection of the choice by a user can be prevented by not displaying an item which does not have a choice of selection to the user. It is also possible to gloomily display an item and the choice uniquely determined instead of not displaying an item which does not have a choice of selection to the user and to prevent the user from selecting it. According to this, a choice is uniquely determined by the user and it is possible that the user can clearly understand that there is no selection choice.

Next, a third example of the described coordination process will be explained using FIGS. 15a, 15b and 16. FIGS. 15a and 15b respectively illustrates a schematic diagram showing an example of the input parameter list IPL and the output parameter list OPL for explaining the third example of the coordination process, and FIG. 16 illustrates a schematic diagram showing an example of the coordination parameter list CPL for explaining the third example of the coordination process.

In FIG. 15, with respect to the input parameter list IPL of a scanner, as shown in FIG. 15a, "resolution" has two choices of "300 dpi" and "600 dpi". This point differs from the list illustrated in FIG. 9a. On the other hand, as the output parameter list OPL of the printer shown in FIG. 15b, it is different from the list which shown in FIG. 9b as an example in the following two point that "color selection" has only color and does not have monochrome and there is no item of "staple binding".

When the coordination of the input parameter list IPL of an example described above and the output parameter list OPL are taken, as shown in the coordination parameter list CPL in FIG. 16, "resolution" has only "600 dpi" and "color selection" has only "color". The choices of all the items will be uniquely determined. In this case, the display operation total control section 201 outputs a display prohibition signal which prohibits a display of the parameter setup screen PS towards the display control section 211, and a display of the parameter setup screen PS to the display 221 is made not to be performed. Simultaneously, the display operation total control section 201 generates a fixed input parameter list FIPL and a fixed output parameter list FOPL from the coordination parameter list CPL of FIG. 16, and transmits them to the input apparatus control 111 which controls a scanner and the output apparatus control 121 which controls a printer.

According to the third example the coordination process described above, choices of all the parameter items are uniquely determined as a result of the coordination process. In case where the user does not have choices of selection, the display of the parameter setup screen PS to the display 221 is made not to be performed. As a result, incorrect selection of a choice by a user can be prevented. Here, it is possible to gloomily display a choice uniquely determined as a parameter item, and to prevent a user from selecting the choice instead of displaying a parameter setup screen PS onto the display 221 as well as the second example of the coordination process described above. According to this, it is possible for a user to clearly understand that a choice of a parameter is uniquely determined and the user does not have choices of selection.

Next, a fourth example of the coordination process described above will be described using FIGS. 17a and 17b. FIGS. 17a and 17b respectively illustrate a schematic diagram showing an example of the input parameter list IPL for explaining the fourth example of the coordination process and the output parameter list OPL.

In FIGS. 17a and 17b, with respect to the input parameter list IPL of the scanner, as shown in FIG. 15a, "resolution" has two choices of "1200" and "2400 dpi", which are different from an example of the list illustrated in FIG. 9a. On the other hand, as the output parameter list OPL of the printer shown in FIG. 15b, it is different from the list which shown as an example in FIG. 9b in the following two points that "resolution" has "300 dpi" and "600 dpi" and "color selection" has only color and does not have monochrome.

In case when taking coordination of the input parameter list IPL of the example described above and the output parameter list OPL, a choice common to the input parameter list IPL and the output parameter list OPL does not exist in choices of "resolution", and the coordination process cannot be performed. In this case, the display operation total control section 201 outputs selected combination prohibition information that "the combination of a scanner and a printer is prohibited" to the display control section 211, and displays a purport that the selected "combination of a scanner and a printer" is prohibited on the display 221. Simultaneously, make the user select an input apparatus and an output apparatus again.

According to the fourth example of the coordination process described above, in case where the choice common to the input parameter list IPL and the output parameter list OPL does not exist and the coordination process cannot be performed, the indication that the selected combination of selected input/output apparatus is prohibited is displayed. Based on this thought, it is possible to make a user understand that selection of input/output apparatus has an error, and to make the user re-select the input/output apparatus.

Next, a fifth example of the coordination process described above will be explained using FIGS. 17a, 17b 18a and 18b. FIGS. 17a and 17b respectively illustrate a schematic diagram showing an example of the input parameter list IPL and the output parameter list OPL the same as the fourth example of the coordination process described above. FIGS. 18a and 18b respectively illustrate a schematic diagram showing an example of the coordination parameter list CPL and the fixed input parameter list FIPL for explaining the fifth example of the coordination process.

In FIGS. 17a and 17b, a choice common to the input parameter list IPL and the output parameter list OPL does not exist in the choices of "resolution", and the coordination process cannot be performed. In this case, the data input/output system 1 searches other input/output functions which configure data input/output system 1, or various functions of the exterior of data input/output system 1, for example like Internet. For example, the data input/output system 1 searches a resolution conversion service. Suppose that resolution conversion service which converts "1200 dpi" into "600 dpi" and converts "1200 dpi" into "300 dpi" are discovered, for example, on the Internet as a result of search.

In this case, the display operation total control section 201 sets "600 dpi", and "300 dpi", which are resolutions after resolution conversion, as choices in the items of resolution in the coordination parameter list CPL, as shown in FIG. 18a.

Further, URL (Uniform Resource Locator: showing the address of the information in the Internet) of the resolution conversion service is described as attached information of a choice.

When a required resolution is chosen from the choices of "600 dpi" and "300 dpi" of the items of the described "resolution", at STEP S140 "parameter setting subroutine" in FIG. 2 by the user (for example, suppose that "600 dpi" has been chosen), URL of resolution conversion service attached to the choice of "600 dpi" is handed over to either of or both of the fixed input parameter list FIPL to be transmitted to the input apparatus control or the fixed input parameter list FIPL to be transmitted to the output apparatus control at the time of execution of STEP S150 "pipe formation subroutine in FIG. 2". FIG. 18b shows an example handed over to the fixed input parameter list FIPL.

Then, the document is scanned in a resolution before the resolution conversion, i.e., resolution of "1200 dpi", with a scanner at the time of execution of STEP S160 "input/output subroutine" in FIG. 2. Input data 113 of "1200 dpi" generated by the input apparatus control 111" is transmitted to URL of the resolution conversion service attached to the choice of "600 dpi", and resolution conversion is performed. The input data 113 of "1200 dpi" will be returned as input data 113 of "600 dpi", and it is transmitted to the pipe 103. Then, it will be outputted from the printer in resolution of "600 dpi".

Or, the input data 113 is scanned in resolution of "1200 dpi" with a scanner. After it is transmitted to the pipe 103 and the input data 113 of "1200 dpi" generated by the input apparatus control 111 is received by output apparatus control 121, it is transmitted to URL of resolution conversion service attached to the choice of "600 dpi", and resolution conversion is performed.

Then, it may be returned as input data 113 of "600 dpi", and outputted from the printer in resolution of "600 dpi".

According to the fifth example of the coordination process described above, in case where the choice common to the input parameter list IPL and the output parameter list OPL does not exist and a coordination process cannot be performed, by searching another input/output function which configures the data input/output system 1, or various functions of the exterior of the data input/output system 1, and discovering and using required services, even though in case where selection of a user's input/output apparatus has an error, input/output operation, which reflects user's intention shown by the selection of the parameter as much as possible, can be performed.

Next, a sixth example of the coordination process described above will be explained using FIG. 19. FIG. 19 illustrates a schematic diagram showing an example of the input parameter list IPL for explaining the sixth example of the coordination process.

In the present invention, when the input parameter list IPL of the scanner shown, for example, in FIG. 9a is taken for an example, contents described between a line written in <Scanner> and a line written in </Scanner> are supposed to be an input parameter of the scanner. Similarly, contents which are described between a line written in <resolution> and a line written in </resolution> are supposed to be the parameters of resolution. However, in the input parameter list IPL of the scanner illustrated in FIG. 19, although a line written in <Scanner> exists, due to the defamation of data etc., a line written in </Scanner> has broken off in the middle or does not exist. Therefore, an input parameter of the scanner cannot be specified.

Thus, in case where a certain abnormal, such as, defamation, is discovered in the input parameter list IPL or the output parameter list OPL, the display operation total control section 201 requests the re-input of the input parameter list IPL to the input apparatus control 111 via the first transmission and reception section 203 or the output parameter list OPL to the output apparatus control 121 via the second transmission and reception section 205. Although the re-input of the input parameter list IPL or the output parameter list OPL is performed, in case where abnormal of described input parameter list IPL or output parameter list OPL is not improved, the data input/output processing will be suspended.

According to the sixth example of the coordination process described above, in case when abnormal is discovered in the input parameter list IPL or the output parameter list OPL and the parameter cannot be specified, a re-input of the input parameter list IPI or the output parameter list OPL will be performed. In case where improvement still is not found, the input/output operation which a user does not have intention to conduct will be prevented by suspending data input/output processing.

As described above, according to the present invention, in the data input/output system having a plurality of input apparatuses and output apparatuses, by taking coordination of an input parameter which sets up conditions of the input apparatus used for data input, and an output parameter which sets up conditions of the output apparatus used for data output and displaying them, the setup of the optimum setting item in the combination between the input/output apparatuses, which is needed in case where many input/output apparatuses are connected, can be easily and securely carried out by the minimum operation, and there can be provided a data input/output system, a data input/output system control method and a data input/output system control apparatus, which can eliminate operation errors.

With respect to the detail structures and detail operations of each structure which configure a data input/output system, a data input/output system control method and a data input/output system control apparatus related to the present invention, various changes and modification may be made without departing from the scope of the invention.

The invention claimed is:

1. A data input/output system comprising:
a plurality of input apparatuses for inputting data;
a plurality of output apparatuses for outputting data;
a data path formation section which connects with the plurality of input apparatuses and the plurality of output apparatuses and forms a data path for outputting inputting data inputted by any one of the plurality of input apparatuses to any one of the plurality of output apparatuses;
a first transmission and reception section which receives an input parameter list for setting an operation condition of the input apparatus among the plurality of the input apparatuses and stores the input parameter list;
a second transmission and reception section which receives an output parameter list for setting an operation condition of the output apparatus among the plurality of the output apparatuses and stores the output parameter list;
an input apparatus selection section which selects the input apparatus used for data input among the plurality of input apparatuses;
an output apparatus selection section which selects the output apparatus used for data output among the plurality of output apparatuses;
a parameter coordination section which performs a coordinating processing for coordinating the input parameter list of the input apparatus selected by the input apparatus selection section and the output parameter list of the output apparatus selected by the output apparatus selection section, and generates a coordination parameter list;
a display apparatus; and
a display control section which executes the display apparatus to display an parameter setup screen based on the coordination parameter list;
wherein, when a choice of every item of the coordination parameter list is uniquely determined, the coordinating processing is a processing for outputting a display prohibiting signal which prohibits the display control section from executing the display to display a parameter setting screen, based on the coordination parameter list.

2. The data input/output system disclosed in claim 1, wherein the coordinating processing is a processing for consolidating an item overlapping between the input parameter list of the selected input apparatus and the selected output parameter list of the output apparatus.

3. The data input/output system disclosed in claim 1, wherein the coordinating processing is a processing for consolidating a choice of an item overlapping between the input parameter list of the selected input apparatus and the output parameter list of the selected output apparatus into a common choice between the input parameter list of the selected input apparatus and the output parameter list of the selected output apparatus.

4. The data input/output system disclosed in claim 1, wherein, when at lease one of the selected input parameter list of the input apparatus and the output parameter list of the selected output apparatus has a recommendation choice, the coordinating processing is a processing for reflecting the recommendation choice on a priority of a choice of the coordination parameter list.

5. The data input/output system disclosed in claim 1, wherein the coordinating processing comprises a processing for checking if there is a defect in the input parameter list of the selected input apparatus or in the output parameter list of the selected output apparatus.

6. A data input/output system comprising:
a plurality of input apparatuses for inputting data;
a plurality of output apparatuses for outputting data;
a data path formation section which connects with the plurality of input apparatuses and the plurality of output apparatuses and forms a data path for outputting inputting data inputted by any one of the plurality of input apparatuses to any one of the plurality of output apparatuses;
a first transmission and reception section which receives an input parameter list for setting an operation condition of the input apparatus among the plurality of the input apparatuses and stores the input parameter list;
a second transmission and reception section which receives an output parameter list for setting an operation condition of the output apparatus among the plurality of the output apparatuses and stores the output parameter list;
an input apparatus selection section which selects the input apparatus used for data input among the plurality of input apparatuses;
an output apparatus selection section which selects the output apparatus used for data output among the plurality of output apparatuses;
a parameter coordination section which performs a coordinating processing for coordinating the input parameter list of the input apparatus selected by the input apparatus selection section and the output parameter list of the output apparatus selected by the output apparatus selection section, and generates a coordination parameter list;
a display apparatus; and
a display control section which executes the display apparatus to display an parameter setup screen based on the coordination parameter list;
wherein, when there is no common choice in a choice of an item overlapping between the input parameter list of the selected input apparatus and the output parameter list of the selected output apparatus, the coordinating processing is a processing for outputting a combination prohibiting information which prohibits a combination of the selected input apparatus and the selected output apparatus.

7. The data input/output system disclosed in claim 6, wherein the coordinating processing is a processing for consolidating an item overlapping between the input parameter list of the selected input apparatus and the selected output parameter list of the output apparatus.

8. The data input/output system disclosed in claim 6, wherein the coordinating processing is a processing for consolidating a choice of an item overlapping between the input parameter list of the selected input apparatus and the output parameter list of the selected output apparatus into a common choice between the input parameter list of the selected input apparatus and the output parameter list of the selected output apparatus.

9. The data input/output system disclosed in claim 6, wherein, when at lease one of the selected input parameter list of the input apparatus and the output parameter list of the selected output apparatus has a recommendation choice, the coordinating processing is a processing for reflecting the recommendation choice on a priority of a choice of the coordination parameter list.

10. The data input/output system disclosed in claim 6, wherein the coordinating processing comprises a processing for checking if there is a defect in the input parameter list of the selected input apparatus or in the output parameter list of the selected output apparatus.

11. A data input/output system comprising:
a plurality of input apparatuses for inputting data;
a plurality of output apparatuses for outputting data;
a data path formation section which connects with the plurality of input apparatuses and the plurality of output apparatuses and forms a data path for outputting inputting data inputted by any one of the plurality of input apparatuses to any one of the plurality of output apparatuses;
a first transmission and reception section which receives an input parameter list for setting an operation condition of the input apparatus among the plurality of the input apparatuses and stores the input parameter list;
a second transmission and reception section which receives an output parameter list for setting an operation condition of the output apparatus among the plurality of the output apparatuses and stores the output parameter list;
an input apparatus selection section which selects the input apparatus used for data input among the plurality of input apparatuses;
an output apparatus selection section which selects the output apparatus used for data output among the plurality of output apparatuses;
a parameter coordination section which performs a coordinating processing for coordinating the input parameter list of the input apparatus selected by the input apparatus selection section and the output parameter list of the output apparatus selected by the output apparatus selection section, and generates a coordination parameter list;
a display apparatus; and
a display control section which executes the display apparatus to display an parameter setup screen based on the coordination parameter list;
wherein, when there is no common choice in a choice of an item overlapping between the input parameter list of the selected input apparatus and the output parameter list of the selected output apparatus, the coordinating processing is a processing for complementing the choice of the overlapping item by a function which exists in the input apparatus and the output apparatus included in the data input/output system other than the selected input apparatus and the selected output, or by a function which exists outside of the data input/output system.

12. The data input/output system disclosed in claim 11, wherein the coordinating processing is a processing for consolidating an item overlapping between the input parameter list of the selected input apparatus and the selected output parameter list of the output apparatus.

13. The data input/output system disclosed in claim 11, wherein the coordinating processing is a processing for consolidating a choice of an item overlapping between the input parameter list of the selected input apparatus and the output parameter list of the selected output apparatus into a common choice between the input parameter list of the selected input apparatus and the output parameter list of the selected output apparatus.

14. The data input/output system disclosed in claim 11, wherein, when at lease one of the selected input parameter list of the input apparatus and the output parameter list of the selected output apparatus has a recommendation choice, the coordinating processing is a processing for reflecting the recommendation choice on a priority of a choice of the coordination parameter list.

15. The data input/output system disclosed in claim 11, wherein the coordinating processing comprises a processing for checking if there is a defect in the input parameter list of the selected input apparatus or in the output parameter list of the selected output apparatus.

* * * * *